Aug. 18, 1942.  P. F. COVINGTON  2,293,280
ELEVATED FISHING LINE GUIDE
Filed April 23, 1941.
Fig. 1.
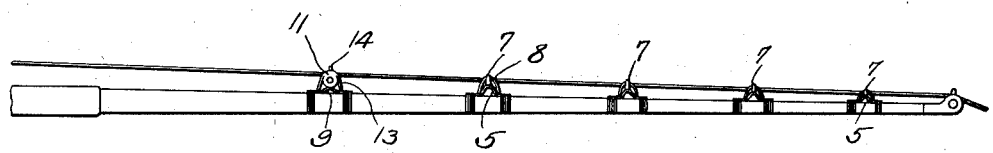
Fig. 2.
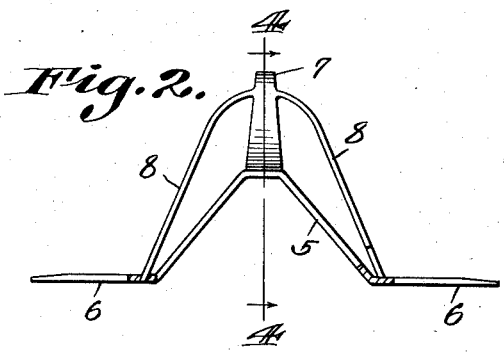
Fig. 4.
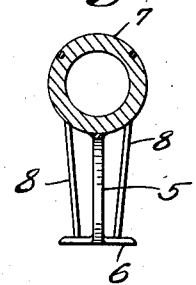
Fig. 3.
Fig. 5.
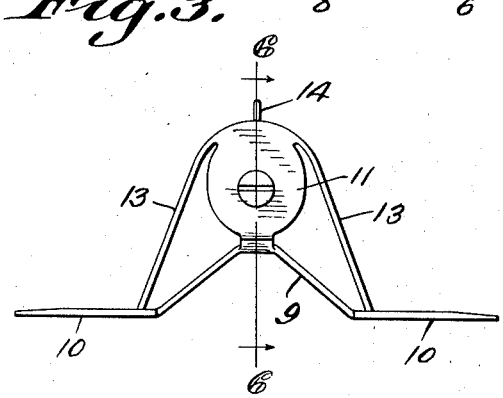
Fig. 6.
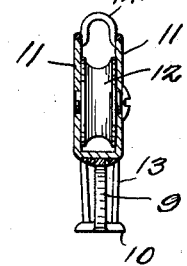
P. F. Covington
INVENTOR.
BY Patented Aug. 18, 1942

2,293,280

UNITED STATES PATENT OFFICE 2,293,280

ELEVATED FISHING LINE GUIDE

Paul F. Covington, Miami, Fla.

Application April 23, 1941, Serial No. 389,967

1 Claim. (Cl. 43—24)

This invention relates to line guides for fishing rods, the primary object of the invention being to provide an elevated line guide which will support the line passing therethrough, in spaced relation with the rod at all times thereby providing a guide which will insure the line running on the bearings of the guides and preventing the line rubbing the rod, when the rod bends.

An important object of the invention is to provide a fishing line guide which will bend with the rod, thereby relieving the wrappings of undue strain commonly directed thereto, as the rod is bent under a load.

Another object of the invention is to provide a line guide wherein the main or body portion is constructed of a single piece of metal, eliminating soldered joints which frequently break, rendering the guide inoperative, when the guide is subjected to a severe load.

Still another object of the invention is to provide a line guide which is substantially flexible, permitting the rod to bend evenly, throughout its length, thereby distributing the strain on the rod.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view illustrating line guides constructed in accordance with the invention, as mounted on a fishing rod.

Figure 2 is an enlarged elevational view of one of the guides, portions of the guides being broken away illustrating the manner of securing the upper section of the guide to the main or body portion thereof.

Figure 3 is a bottom plan view of the line guide.

Figure 4 is a sectional view taken on line 4—4 of Figure 2.

Figure 5 is an elevational view illustrating a similar line guide wherein a pulley or roller is provided as a bearing for the line passing therethrough.

Figure 6 is a sectional view taken on line 6—6 of Figure 5.

Referring to the drawing in detail, the main or body portion of the guide is indicated by the reference character 5 and is formed preferably of brass. As shown, the body portion is in the form of an arch. The ends of the body portion 6, and which constitute the seat of the guide, are substantially wide and constructed to fit over a fishing rod, to be secured thereto by means of the usual wrappings employed for this purpose.

The reference character 7 designates the ring or bearing of the line guide, which is wide at its lower portion and tapered to a substantially narrow upper portion, as clearly shown by Figure 2 of the drawing.

Brace rods indicated at 8 are secured to the ring or bearing 7, near the upper portion thereof, the rods 8 being arched to support the ring in true upright position.

The lower ends of the brace rods 8 extend into openings formed in the seat or ends 6 of the body portion, where they are secured as by means of solder or the like material. It will of course be understood that the edges of the ring or bearing 7, are beveled to provide a smooth surface over which the fishing line used through the guide, engages, reducing wear to a minimum.

In the form of the invention as shown by Figure 5 of the drawing, the main or body portion of the guide is indicated generally by the reference character 9, and also includes wide feet 10 that constitute the support for the bearing.

The portion 9 is also arched in this form of the invention, and provides a support for the disks 11 which are held in spaced relation with respect to each other, and between which the pulley or roller 12 is mounted. Brace rods 13 extend from the seat 10, over the upper edges of the disks 11 bracing the disks 11. These disks 11 are also braced against spreading, by the member 14 which connects with the inner surfaces of the disks 11 at their upper edges, the member 14 providing an arch directly over the pulley or roller 12, to guard against the fishing line moving over the pulley or roller 12, becoming fouled.

From the foregoing it will be seen that due to the construction shown and described, I have provided a line guide which will not only support the fishing line used therewith, in spaced relation with the fishing rod, but will insure the line moving in a straight line from the reel, which is supported adjacent to the handle of the rod, to the first guide of the rod, and which is preferably of the type shown by Figure 5 of the drawing.

It will further be seen that due to the construction of the line guide, the guide may bend with the rod on which it is supported, thereby relieving the wrappings of undue strain which usually causes the wrappings to break. It is further pointed out line guides constructed in accordance with the present invention, permit the rod to bend uniformly throughout the entire length thereof distributing the strain throughout the length of the rod.

What is claimed is:

In a fishing line guide for use on fishing rods, a body portion comprising a bar, wide feet formed at the ends of the bar and adapted to be secured to the rod, on which the guide is positioned, the portions of the bar between the feet being extended upwardly at oblique angles with respect to the feet, forming an arch, the crown point of the arch embodying a substantially straight portion, a circular bearing member secured on the short straight portion of the arch, and substantially vertical rods connected with the circular bearing member adjacent to the upper edge thereof and being connected with the feet at points adjacent to the points of the connection between the ends of the bar and feet.

PAUL F. COVINGTON.